(12) United States Patent
Campbell et al.

(10) Patent No.: US 7,464,056 B1
(45) Date of Patent: Dec. 9, 2008

(54) METHOD FOR MANAGING CUSTOMER FINANCIAL ACCOUNTS

(75) Inventors: Maxine H. Campbell, Lancaster, SC (US); Greg L. Verego, Charlotte, NC (US)

(73) Assignee: DST Innovis, Inc., El Dorado Hills, CA (US)

( * ) Notice: Subject to any disclaimer, the term of this patent is extended or adjusted under 35 U.S.C. 154(b) by 883 days.

(21) Appl. No.: 10/881,396

(22) Filed: Jun. 30, 2004

(51) Int. Cl.
*G06Q 40/00* (2006.01)

(52) U.S. Cl. .............................. 705/39; 705/14; 705/40; 705/412

(58) Field of Classification Search ............. 707/1–104; 705/35–45; 700/1–306
See application file for complete search history.

(56) References Cited

U.S. PATENT DOCUMENTS

2002/0099564 A1* 7/2002 Kim et al. ....................... 705/1
2003/0154135 A1* 8/2003 Covington et al. ............ 705/26

OTHER PUBLICATIONS

Steve Zipay's article Fans Frustrated Even While Attending Game, Newsday, Apr. 6, 2002, p. A43.*

* cited by examiner

*Primary Examiner*—Mary Cheung
*Assistant Examiner*—Brian Fertig
(74) *Attorney, Agent, or Firm*—Brinks Hofer Gilson & Lione

(57) ABSTRACT

A method for managing customer financial accounts in a system for the delivery of products to a customer includes providing a customer account, first customer record, a second customer record, a product database, and a retailer database. The customer account is associated with the retailer database, the first customer record, and the product database. The first customer record is associated with the customer account, where an object of the first customer record is identified as a payer for the products. The second customer record is associated with the product database, where an object of the second customer record is identified as a consumer of the products. A second customer account and a second product database can be associated with the second customer record. The second customer account includes transaction records for the second customer record and provides transaction invoices to the second customer record.

20 Claims, 4 Drawing Sheets

METHOD FOR MANAGING CUSTOMER FINANCIAL ACCOUNTS

REFERENCE TO RELATED APPLICATIONS

Related subject matter is disclosed in co-pending, commonly-assigned patent applications: entitled "POLICY GROUP RULES ENGINE" having Ser. No. 10/856,537; "POLICY CONFIGURATION USER INTERFACE" having Ser. No. 10/856,538; and "POLICY GROUP RULES ENGINE DATA MODEL" Ser. No. 10/856,384, all filed May 28, 2004, the disclosures of which are incorporated by reference herein.

TECHNICAL FIELD

The present invention relates, generally, to methods of operating electronic data processing systems to manage customer financial accounts and, more particularly, to methods of managing customer financial accounts that can accommodate multiple customers and products.

BACKGROUND

The technologies supporting automated data processing of customer data have matured rapidly and become quite powerful in a relatively short time period. As a result, processing system hardware is now powerful enough and fast enough to execute complex calculations on large volumes of customer data for a multitude of purposes. The rapid advances in processing system hardware, however, tend to outpace corresponding advances in software.

As one example, past approaches to processing customer data, such as preparing invoices, generally relied upon inflexible hard-coded relationships among the various system components. While the software might have captured the desired processing steps at the time the software was written, its hard-coded nature made the software inflexible, and in some cases, unsuitable for the software owner at a later date. With such software, the software owner could only initiate changes, if at all, through an expensive, time consuming re-programming process that required a software vendor programmer to modify the software by hand to suit customer specifications.

Even when a software owner was willing to incur the expense and delay, the modified software still had drawbacks. As an example, every custom software release requires individuals to track, understand, and support the software. Consequently, custom software increased the costs for the software vendor as well as the software owner, and led to a general lack of standardization that hampered efficient production, delivery, and support of the software.

The software inflexibility problem is often most severe where the owner's business changes over time. The owners of data processing systems to manage customer financial accounts often have businesses that evolve over time. For example, many businesses develop from single service organizations when they start business to complex organizations that include multiple lines of business. The multiple lines of business can bring the need for multiple customer accounts each having multiple products and billing requirements. The data processing systems that are used by these organizations often lack the flexibility to support the multiple lines of business. Accordingly, a need existed for an automated data processing method that can accommodate variable financial account and billing requirements for multiple customer financial relationships, and that will allow the software owner to develop or change the system operation on an on-going basis.

BRIEF SUMMARY

In one embodiment of the invention, a method for managing customer financial accounts in a system for the delivery of products to a customer includes providing a customer account, a first customer record, a second customer record, a product database, and a retailer database. The customer account is associated with the retailer database, the first customer record, and the product database. The first customer record is associated with the customer account, such that the association identifies an object of the first customer record as a payer for the products. The second customer record is associated with the product database, such that the association identifies an object of the second customer record as a consumer of the products.

In another embodiment of the invention, a method for managing customer financial accounts for multiple customers within an enterprise system includes providing a customer account, a first customer record, a retailer database, a product database, and a second customer account. The customer account is associated with the retailer database and with the product database. The product database is associated with the second customer record. The customer account includes transaction records for the second customer record and provides invoices for the transaction records to the first customer record where the first customer record and the second customer record are databases for separate entities.

In yet another embodiment of the invention, a method for managing customer financial accounts for multiple customers within an enterprise system includes providing a customer account associated with at least one retailer database. The customer account is associated with one or more product databases and the customer account is also associated with a first customer record. The one or more product databases are also associated with a second customer record. An object of the first customer record is identified as a payer for the one or more products and an object of the second customer record is identified as a consumer of the one or more products.

DETAILED DESCRIPTION

The present invention is intended for use with an enterprise system that provides customer care and billing business processes. Although the enterprise system is flexible and can address a variety of applications, the instant system ideally supports lines of business, such as cable television, direct home satellite services, telephony, utilities, internet services, and the like. Within this context, the portion of the enterprise system to which the instant invention is directed provides a wide variety of services, including customer management, service provider management, account financial management, billing, and the like.

The enterprise system is designed to provide services to a variety of users within and associated with a business enterprise. The users include the system administrator, customers, system operator, retailers or the retailer's sales agents, suppliers, network operators, and the like.

The enterprise system uses related databases to control processing-based characteristics of the users and other entities, such as customers, retailers, accounts, targets, and the like. As used herein, customers are end users of the services provided by an operator of the enterprise system. Retailers are sellers and invoice generators of the products sold by the operator, accounts are the business record files of customers and retailers, and targets are devices or device components that send and receive electronic signals.

Within the enterprise system, customer financial account management provides the databases for creating and maintaining customer financial account information. The databases include customer accounts and account associations that constitute account ledgers. The customer information includes customer name, preferences, such as language, and identifiers, such as social security number, and the like.

Separate databases are provided for customers and for accounts. As referred to herein, a "customer" is a person or organization who purchases products or uses products sold by a retailer. An account is the financial record that represents the relationship between a customer and a retailer. In the method of the present invention, the customer can have more than one role. The customer can be the financially responsible party that pays amounts due for products and services. The customer may or may not be the actual consumer of the goods and services. Accordingly, the customer can be a consumer, but not the person or organization that actually pays for the goods and services. The account may also be associated with a contract database that details financial and/or service agreements between the customer and the retailer.

The instant invention provides a method of managing a customer account that includes a products database to record and monitor delivery and billing of products from the retailer to the customer. The products may be tangible items, such as video products, or intangible items, such as installation services.

Figure 1:
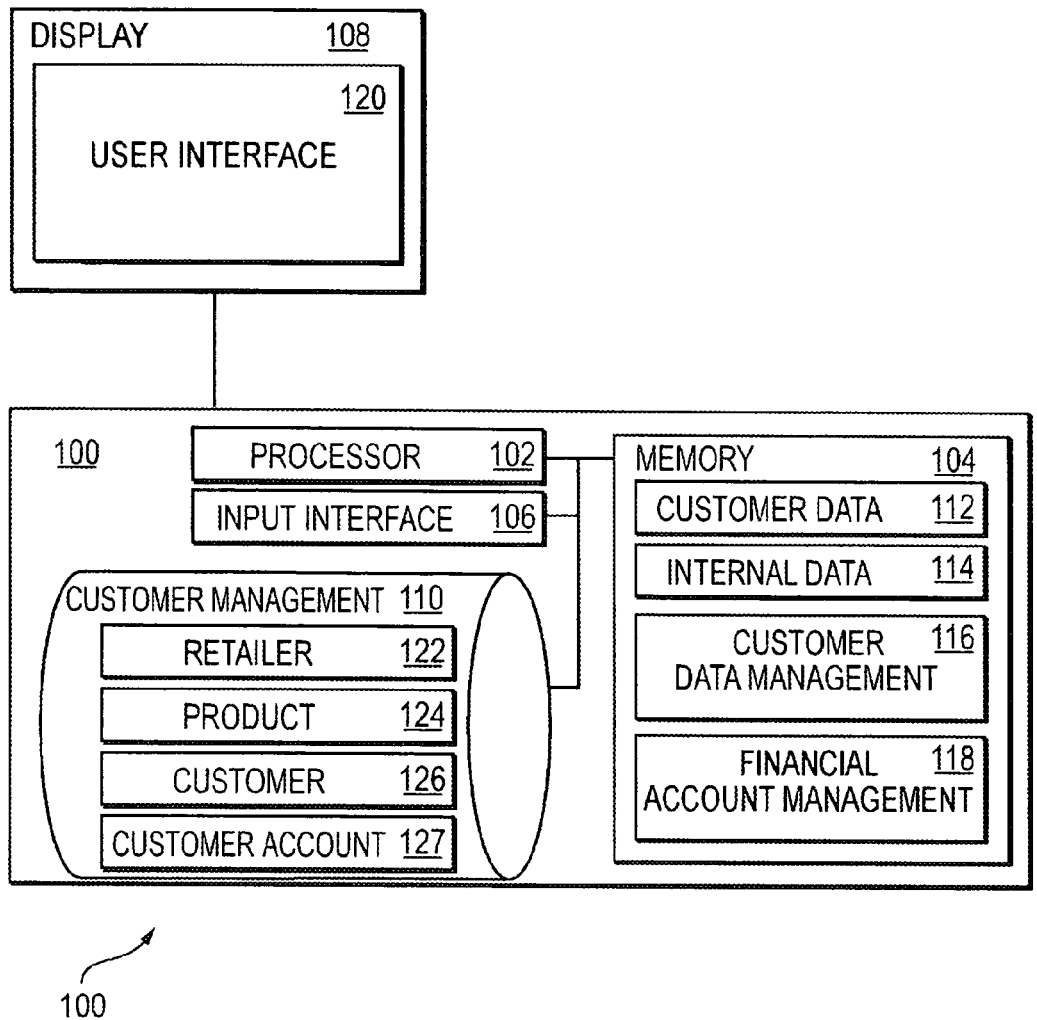
FIG. 1 illustrates a data processing system for management of a customer account.

FIG. 1 shows a data processing system 100 that operates using various databases for management of a customer account. Data processing system 100 includes a processor 102, a memory 104, and an input interface 106. Data processing system 100 further includes a display 18 and a customer management database 110.

The memory 104 stores data, for example the customer data 112, the internal data 114, and programs, for example, customer data management program 116 and a financial account management program 118. A user interface 120 assists an operator to structure a customer account for application to the customer data 112. The customer management database 110 implements a data model for the customer account, including, as examples, databases for retailer 122, product 124, customer 126, and customer account 127.

The particular implementation described herein is exemplary in nature. For example, although selected aspects, features, or components of the implementations are depicted as being stored in the memory 104 and customer management database 110, all or part of systems and methods consistent with the present invention may be stored on or read from other machine-readable media, for example, secondary storage devices such as hard disks, floppy disks, and CD-ROMs; a signal received from a network; or other forms of machine readable memory either currently known or later developed.

Furthermore, the specific components of the data processing system 100, such as methods, systems, and articles of manufacture consistent with the customer management process may include additional components or different components. For example, the processor 102 may be a microprocessor, microcontroller, application specific integrated circuit (ASIC), discrete logic, or a combination of other types of circuits acting as explained below. Similarly, the memory 104 may be DRAM, SRAM, Flash or any other type of memory. Customer management database 110 may be separately stored and managed, split into multiple databases, and generally logically and physically organized in many different ways. Furthermore, customer management database 110 may more generally represent data files searchable using techniques other than relational database queries. Also, the individual programs may be parts of a single program, separate programs, program libraries, or distributed across several memories, processors, and the like.

Figure 2:
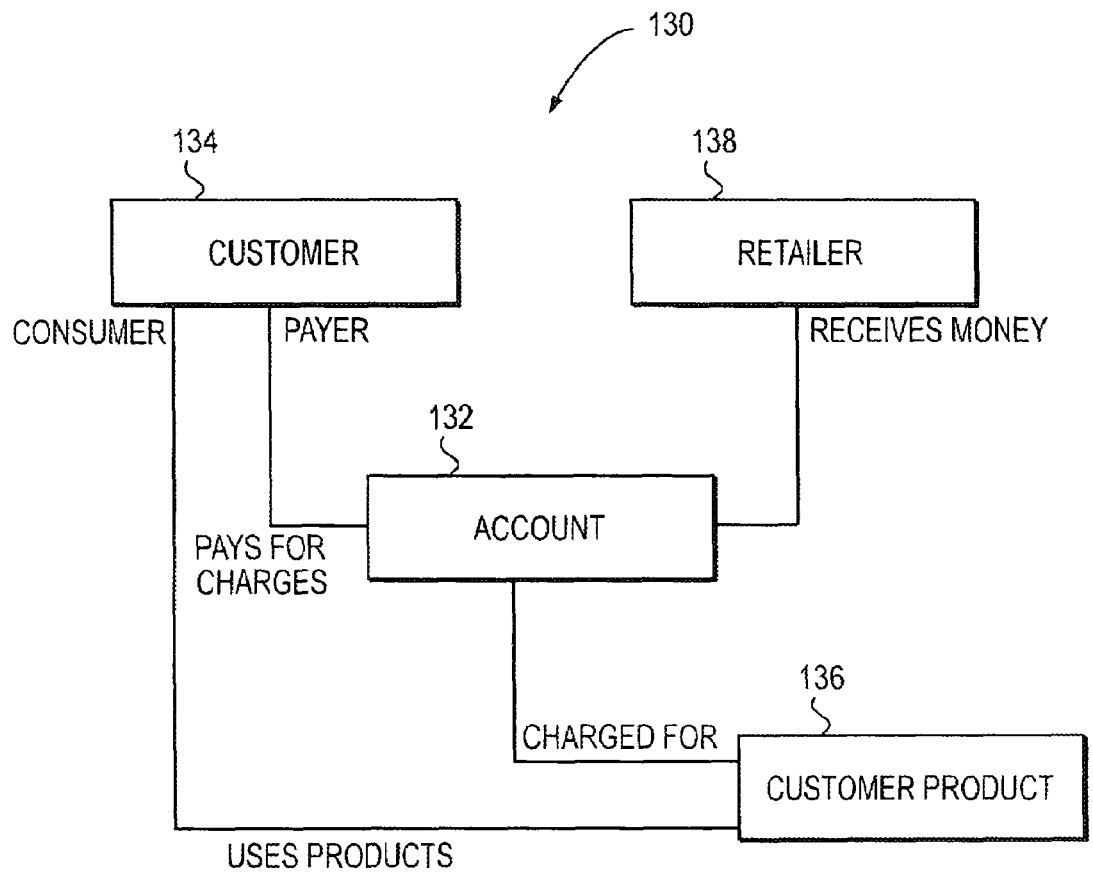
FIG. 2 illustrates a high order data model for a typical customer financial account system.

Shown in FIG. 2 is a data model 130 for a typical customer financial account. When a customer purchases a product and/or agrees to pay for a product from a retailer a financial relationship is established. In the data processing system, the financial relationship is represented by a customer account 132. A customer in most cases will be both the payer for and consumer of purchased products. A customer record 134 is associated with a product database 136 and with customer account 132. A retailer database 138 is associated with account 132.

In data model 130, customer record 134 is associated with product database 136 as the consumer of the products. Also, customer record 134 is associated with customer account 132 as the payer of the account. Retailer database 138 receives financial credit from account 132 for products purchased by the customer. Accordingly, in the data model shown in FIG. 2 is structured for the situation where the customer is both the consumer of the products and the payer for the products purchased from the retailer.

An enterprise system incorporating a customer account management system based on data model 130 cannot be easily changed to accommodate multiple roles or separate databases, or both, for the customer. In order to adapt a system based on data model 130 to a multiple role or multiple customer records, the software must be reprogrammed. In accordance with one embodiment of the invention, to accommodate changes in customer roles, an operator can make necessary changes to the system operation using data processing system 100. These changes can be made without the need to reprogram the operating software for the enterprise system.

Figure 3:
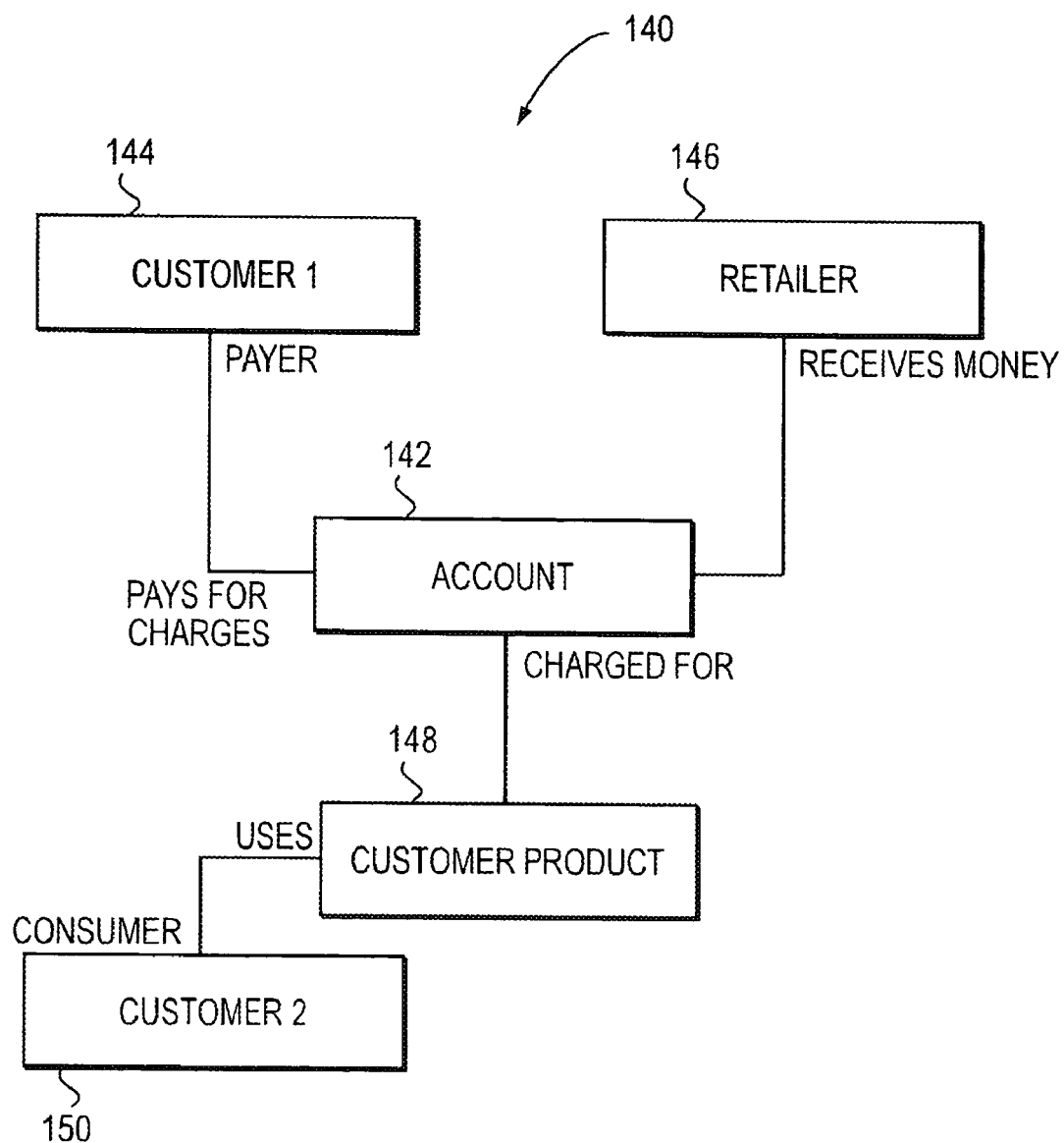
FIG. 3 illustrates a high order data model for a customer financial account system arranged in accordance with an embodiment of the invention.

FIG. 3 illustrates a data model 140 for a system arranged in accordance with an embodiment of the invention. In similarity to data model 130, a customer account 142 is associated with a customer record 144 and a retailer database 146. Customer account 142 is also associated with a product database 148. A second customer record 150 is associated with product database 148, where the entity of database 150 is identified as a consumer of products, but not the payer for the products.

A system based on data model 140 allows for accounting of transactions such as gifts, and multiple dwelling units, and the like. For example, a system based on data model 140 permits an individual to be billed for products and services that are provided to another person. This situation can arise where one person, the payer, wants services, such as electrical services, cable television, and the like, provided to another person, the consumer, and the bill for the services sent to the payer. For example, the payer makes a gift of the products and services to the consumer. In another example, a manager or owner of an apartment complex can arrange to have cable television service or electrical service provided to all of the apartment units in the complex, and request that the owner be billed for the television service. Accordingly, the customer role can be assigned as a payer or consumer. Further, the consumer role can be further specified into subcategories, such as a gift recipient or a tenant.

Business financial transaction information is maintained by customer account 144 for transactions between a retailer associated with retailer database 146 and a consumer associated with second customer record 150. The business financial transaction information is maintained in a transaction database (not shown) that includes a predefined plurality of transaction types and an identified purpose of the transaction.

Table I shows a data structure for customer account 144. The data structure designates various attribute fields within customer account 144. In all of the Tables shown herein, the indicated data type format is corresponds to that employed in an Oracle database available from Oracle Corporation, Redwood Shores, Calif.

TABLE I

Customer Data Structure

| Data Field | Data type |
| --- | --- |
| CUSTOMER_ID | NUMBER(18) |
| RETAILER_ID | NUMBER(18) |
| CUSTOMER_TYPE | NUMBER(18) |
| LAST_NAME | VARCHAR2(50) |
| FIRST_NAME | VARCHAR2(50) |
| MIDDLE_NAME | VARCHAR2(50) |
| Preferred LANGUAGE | VARCHAR2(7) |
| VERSION | NUMBER(10) |
| CREATED_BY | VARCHAR2(30) |
| CREATED_TS | TIMESTAMP(6) |
| LAST_MODIFIED_BY | VARCHAR2(30) |
| LAST_MODIFIED_TS | TIMESTAMP(6) |

The data fields shown above in Table I include a Retailer field that designates the first retailer to signup the customer. Also, in Table I and in Tables II-IV below, the Version field may be used in conjunction with concurrent access to the database. When a record is read, the version number is returned. Before changes are made to the record, the system may ensure that the version number is the same. If the version number is different, the system may re-read the record with locking enabled. Upon updating the record, the Version field may be incremented. Further, in Table I and in Tables II-IV below, the first field is a unique system generated identifier for the object of the data structure, in particular, the customer, account, retailer, and product.

In all of the Tables shown herein, the data type includes Number that designates integers of a specified length shown in brackets, Varchar that designates a character string a specified length shown in brackets, and Timestamp that designates a calendar date. A monetary value is indicated where a Number data type is followed by two numbers in the parenthesis and separated by a comma.

In accordance with an embodiment of the invention, the enterprise system recognizes various roles for each record in the association of the databases. As indicated in FIG. 3, the association of customer account 142 with customer record 144 is such that the object of customer record 144 is assigned the role a payer and as one who pays for charges to the account.

A data structure for customer account 142 is shown below in Table II. Customer account 142 includes various attribute fields containing financial information, retailer information and customer role.

TABLE II

Customer Account Data Structure

| Data Field | Data type |
| --- | --- |
| CUSTOMER_ACCOUNT_ID | NUMBER(18) |
| RETAILER_ID | NUMBER(18) |
| BALANCE_AMT | NUMBER(19,4) |
| ACCOUNT_TYPE | NUMBER(18) |
| ACCOUNT_OPEN_TM | TIMESTAMP(6) |
| ACCOUNT_STATUS | NUMBER(18) |
| CYCLE_GROUP | NUMBER(18) |
| PAYER_CUSTOMER_ID | NUMBER(18) |
| WRITEOFF_BALANCE_AMT | NUMBER(19,4) |
| VERSION | NUMBER(10) |
| CREATED_BY | VARCHAR2(30) |
| CREATED_TS | TIMESTAMP(6) |
| LAST_MODIFIED_BY | VARCHAR2(30) |
| LAST_MODIFIED_TS | TIMESTAMP(6) |

The Retailer field in Table II designates the retailer that receives money for this account, and the Payer-Customer field designates the customer that will pay for the charges on this account. This field provides a link with the customer that pays for the charges. The Version field is the same as described above.

The object of retailer database 146 is identified in the role of receiving money from customer account 142. The particular products accounted for in product database 148 are charged to customer account 142 and the object of second customer account 150 is identified in the role of a consumer of the products charged to customer account 142.

A data structure for retailer database 146 is shown below in Table III.

TABLE III

Retailer Data Structure

| Data Field | Data type |
| --- | --- |
| RETAILER_ID | NUMBER(18) |
| RETAILER_NAME | VARCHAR(250) |
| RETAILER_TAX_IDENTIFIER | VARCHAR(230) |
| TAX_COUNTRY_CODE | NUMBER(18) |
| CURRENCY_CODE | NUMBER(18) |
| VERSION | NUMBER(10) |
| CREATED_BY | VARCHAR(230) |
| CREATED_TS | TIMESTAMP(6) |
| LAST_MODIFIED_BY | VARCHAR(230) |
| LAST_MODIFIED_TS | TIMESTAMP(6) |

The Retailer Tax field contains a corporate tax number used by taxing agency in taxing the retailer. The Tax Country Code identifies the country where the tax number is applicable. The currency code is the currency accepted by the retailer as payment.

A product data structure for a record in product database 148 is shown below in Table IV. The product database can be associated with numerous other databases, including sales agent database, a configured target database, and other databases for order management and purchased product tracking. Product database 148 also includes information for one or more video products and services, audio products and services, telephony products and services, internet service provider services, utilities, general merchandise, and the like. Product database 148 also contains video and audio product information including video and audio subscription information and video and audio event product information.

TABLE IV

Customer Product Database

| Data Field | Data type |
| --- | --- |
| CUSTOMER_PRODUCT_ID | NUMBER(18) |
| CONSUMER_CUSTOMER_ID | NUMBER(18) |
| PRODUCT_ID | NUMBER(18) |
| PRICE_ID | NUMBER(18) |
| PURCHASE_DT | DATE |
| QUANTITY | NUMBER(10) |
| QUANTITY_UOM | NUMBER(18) |
| CHARGE_START_DT | DATE |
| CHARGE_END_DT | DATE |
| NON-PAYER CONSUMER ROLE | NUMBER(1) |
| CUSTOMER_ACCOUNT_ID | NUMBER(18) |
| ALTERNATE_ACCOUNT_ID | NUMBER(18) |
| VERSION | NUMBER(10) |
| CREATED_BY | VARCHAR2(30) |
| CREATED_TS | TIMESTAMP(6) |
| LAST_MODIFIED_BY | VARCHAR2(30) |
| LAST_MODIFIED_TS | TIMESTAMP(6) |

In Table IV, Consumer Customer ID identifies the customer that is the consumer of the product. Product ID identifies the product that was purchased and Price ID is the price paid for the product. Nonpayer Consumer Role identifies the role of the customer indicated by Customer ID, where the customer is not the payer of the account for this product and is, for example, a gift recipient or a tenant. Customer Account identifies the customer account to charge for this product. Alternative Account identifies the account to charge for the product when the gift situation or tenant situation is terminated.

As described above, user interface 120 allows a system operator access to the financial account system and enables the operator to make changes to the system configuration without the need to change software code. The user interface is configured to permit the user, for example, to add, update, and delete a customer record, and to identify the object of the customer record as a payer for the products or as a consumer-nonpayer of the products. For example, the user can designate that the product database provide product delivery information to the second customer record (consumer) and provide product purchase information, such as product invoices, and the like to the first customer record (payer). Further, the customer account can be configured to maintain accounts for transactions between the retailer associated with the retailer database and the consumer associated with the second customer record.

The object of retailer database 146 is identified in the role of receiving money from customer account 142. The particular products accounted for in product database 148 are charged to customer account 142 and the object of second customer record 150 is identified in the role of a consumer of the products charged to customer account 142. Invoicing for the products and services can be designated depending upon the customer request. For example, a single invoice can be sent to the customer associated with customer record 144 that includes charges for the services provided to the consumer associated with second customer record 150.

Figure 4:
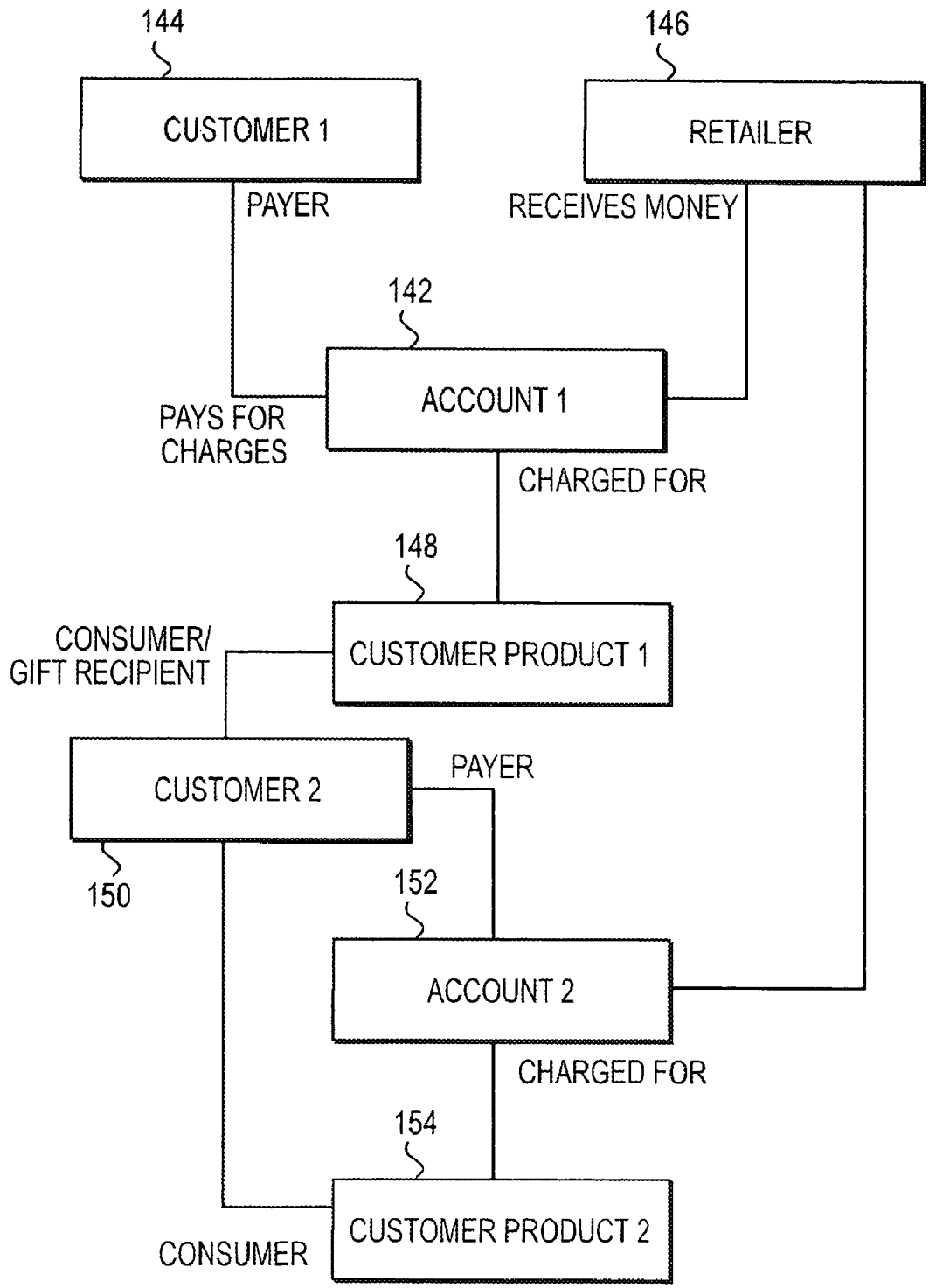
FIG. 4 illustrates a high order data model for a customer financial account system arranged in accordance with another embodiment of the invention.

FIG. 4 illustrates a high order data model for a customer financial account system arranged in accordance with another embodiment of the invention. In the illustrated embodiment, a second customer account 152 is associated with second customer record 150 and with retailer database 146. Second customer account 152 is also associated with a second product database 154. With respect to second customer account 152, the object of second customer record 150 is identified in the role of a payer on the account for products within second product database 154. The retailer associated with retailer database 146 receives money from second product database 154 for products and services provided to the payer associated with second customer record 150.

Accordingly, the method of the invention allows for an object of a customer record to have a dual role for particular products and services. For example, the object of second customer record 150 is identified as a consumer of products maintained in product database 148 and as a payer for products maintained in second product database 154. This technique enables a user to configure the enterprise system to accommodate a situation where the object of second customer record 150 wants additional products and services that are not paid for by the payer associated with customer record 144. Such as situation can arise, for example, where the payer pays for a basic level of service from the retailer and the consumer wishes to add premium services and to pay for the premium services directly.

In accordance with the alternative embodiment, a user can configure the enterprise system to accommodate the situation described above through user interface 120. The role assigned to the object of second customer record 150 in the association established between second customer account 152 is as a payer of the account and the role assigned to the retailer in the association with retailer database 146 is as the entity receiving money for the products maintained in second product database 154. Those skilled in the art will recognize that numerous associations and databases can be configured using the method of the present invention. Accordingly, as such associations are contemplated in the present invention.

Thus, it is apparent that there has been described, in accordance with the invention, a method for managing customer financial accounts that fully meets the advantages set forth above. Although the invention has been described and illustrated of reference to specific illustrative embodiments thereof, it is not intended that the invention be limited to those illustrative embodiments. Those skilled in the art will recognize that variations and modifications can be made without departing of the spirit of the invention. It is therefore intended to include within the invention all such variations and modifications as fall within the scope of the appended claims and equivalents thereof.

The invention claimed is:

1. A method for managing customer financial accounts in a system for delivery of a service to a customer comprising:
   providing a customer management database comprising a customer account, a first customer record, a second customer record, a product database, and a retailer database;
   associating, in the customer management database, the customer account with the retailer database, the first customer record, and the product database;
   associating, in the customer management database, the first customer record with the customer account, wherein the association identifies an object of the first customer record as a payer for a basic level of the service; and
   associating, in the customer management database, the second customer record with the product database, wherein the association identifies an object of the second customer record as a consumer of the service and a payer of a difference between a premium level of the service and the basic level of the service.

2. The method of claim 1 further comprising providing a user interface and providing access from the user interface to the financial account system, wherein the interface is configured to permit the user to add and delete a customer record and to identify the object of the customer record as a payer for a level of the service or as a consumer of the service.

3. The method of claim 1, wherein the product database is configured to provide service delivery information to the second customer record and to provide purchased service information to the customer account.

4. The method of claim 3, wherein the customer account is configured to provide service invoice information to the first customer record.

5. The method of claim 1, wherein business financial transaction information is maintained by the customer account for transactions between a retailer associated with the retailer database and a consumer associated with the second customer record.

6. The method of claim 5, wherein the business financial transaction information is maintained in a transaction database that includes a predefined plurality of transaction types and an identified purpose of the transaction.

7. The method of claim 5, wherein the customer account provides the business financial transaction information to the first customer record.

8. The method of claim 1, wherein providing a product database and providing a customer account comprise providing data structures including data fields and data types.

9. The method of claim 8, wherein the data fields of the product database include a non-consumer customer identification and a payer customer role.

10. The method of claim 9, wherein the data fields of the customer account includes a payer-customer data field.

11. The method of claim 1, wherein the customer management database further comprises a second customer account and a second product database, the method further comprising:
  associating, in the customer management database, the second customer account with the retailer database and with the second product database; and
  associating, the customer management database, the second customer account with the second customer record,
  wherein the second customer account includes transaction records for the second customer record and provides invoices for the transaction records to the second customer record.

12. The method of claim 1, wherein the one or more services comprises one or more of video services, audio services, telephony services, internet service provider services, and utilities.

13. The method of claim 1, wherein the product database contains video service information and wherein the video service information includes video subscription information and video event service information.

14. The method of claim 1, wherein the product database contains audio service information that includes audio event service information and audio subscription service information.

15. A method for managing customer financial accounts for multiple customers within an enterprise system comprising:
  providing a customer management database comprising a customer account, a first customer record, a retailer database, a product database, and a second customer record;
  associating, in the customer management database, the customer account with the retailer database and with the product database, the product database associated with a service;
  associating, in the customer management database, the product database with the with the second customer record; and
  providing invoices for the transaction records to the first customer record for a basic level of service and to the second customer record for a difference between a premium level of service and basic level of service;
  wherein the customer account includes transaction records for the second customer record; and
  wherein the first customer record and the second customer record comprise databases for separate entities.

16. The method of claim 15, wherein providing a customer management database comprising a customer account, first customer record, a retailer database, a product database, and a second customer record further comprises providing relationship information between each database in the customer management database.

17. The method of claim 15, wherein the customer management database further comprises a second account and a second product database, the method further comprising:
  associating, in the customer management database, the second account with the retailer database and with the second product database; and
  associating, in the customer management database, the second account with the second customer record,
  wherein the second account includes transaction records for the second customer record and provides invoices for the transaction records to second customer record.

18. A method for managing customer financial accounts for multiple customers within an enterprise system comprising:
  providing a customer management database comprising a customer account associated with at least one retailer database;
  associating, in the customer management database, the customer account with one or more product databases associated with a service;
  associating, in the customer management database, the customer account with a first customer record, wherein the association identifies an object of the first customer record as a payer for a basic level of the service; and
  associating, in the customer management database, the one or more product database with a second customer record, wherein the association identifies an object of the second customer record as a consumer of the service and a payer of a difference between a premium level of the service and the basic level of the service.

19. The method of claim 18, wherein providing a customer management database comprising a customer account for at least one retailer comprises providing a customer management database comprising an account record for a sales organization authorized by the enterprise to sell the one or more products.

20. The method of claim 18, wherein the one or more services comprises one or more of video services, audio services, telephony services, internet service provider services, and utilities.

* * * * *

UNITED STATES PATENT AND TRADEMARK OFFICE
CERTIFICATE OF CORRECTION

| | | |
|---|---|---|
| PATENT NO. | : 7,464,056 B1 | Page 1 of 1 |
| APPLICATION NO. | : 10/881396 | |
| DATED | : December 9, 2008 | |
| INVENTOR(S) | : Maxine H. Campbell et al. | |

It is certified that error appears in the above-identified patent and that said Letters Patent is hereby corrected as shown below:

In the Claims

In column 10, claim 15, line 6, after "product database" delete "with the" (second occurrence).

Signed and Sealed this
Twenty-fifth Day of January, 2011

David J. Kappos
*Director of the United States Patent and Trademark Office*